United States Patent
Wakizaka

(10) Patent No.: US 10,597,012 B2
(45) Date of Patent: Mar. 24, 2020

(54) VEHICLE BRAKE CONTROL DEVICE

(71) Applicant: AUTOLIV NISSIN BRAKE SYSTEMS JAPAN CO., LTD., Ueda, Nagano (JP)

(72) Inventor: Keisuke Wakizaka, Nagano (JP)

(73) Assignee: AUTOLIV NISSIN BRAKE SYSTEMS JAPAN CO., LTD., Nagano (JP)

( * ) Notice: Subject to any disclaimer, the term of this patent is extended or adjusted under 35 U.S.C. 154(b) by 97 days.

(21) Appl. No.: 15/471,463

(22) Filed: Mar. 28, 2017

(65) Prior Publication Data
US 2017/0282875 A1 Oct. 5, 2017

(30) Foreign Application Priority Data
Mar. 30, 2016 (JP) .................................. 2016-067726

(51) Int. Cl.
*B60T 8/28* (2006.01)
*B60T 8/24* (2006.01)
*B60T 8/74* (2006.01)
*B60T 8/1766* (2006.01)
(Continued)

(52) U.S. Cl.
CPC .............. *B60T 8/28* (2013.01); *B60T 8/1766* (2013.01); *B60T 8/17551* (2013.01); *B60T 8/246* (2013.01); *B60T 8/74* (2013.01); *B60T 13/686* (2013.01); *B60T 2201/16* (2013.01)

(58) Field of Classification Search
None
See application file for complete search history.

(56) References Cited

U.S. PATENT DOCUMENTS 5,842,755 A 12/1998 Sugimoto et al.
6,280,003 B1 8/2001 Oshiro et al.
(Continued)

FOREIGN PATENT DOCUMENTS

DE 19959129 6/2000
JP 2002362342 12/2002
(Continued)

OTHER PUBLICATIONS

European Search Report in related EP application No. 17163544.4-1762, dated Aug. 2, 2017, 4 pages.
(Continued)

*Primary Examiner* — Abdhesh K Jha
(74) *Attorney, Agent, or Firm* — Andrew M. Calderon; Roberts Calderon Safran & Cole, P.C.

(57) ABSTRACT

A vehicle brake control device includes a wheel deceleration calculating unit configured to calculate a wheel deceleration of each of wheels of a vehicle, and a front and rear wheel braking distribution controlling unit configured to execute a front and rear wheel braking distribution control for distributing a braking force on front and rear wheels. The front and rear wheel braking distribution controlling unit is configured to start the front and rear wheel braking distribution control on front and rear wheels of one of left and right sides if an absolute value of a wheel deceleration of the front wheel is equal to or larger than a first threshold and an absolute value of a wheel deceleration of the rear wheel is equal to or larger than a second threshold.

16 Claims, 9 Drawing Sheets

(51) Int. Cl.
*B60T 8/1755* (2006.01)
*B60T 13/68* (2006.01)

(56) References Cited

U.S. PATENT DOCUMENTS

| | | | | |
|---|---|---|---|---|
| 6,338,017 | B1* | 1/2002 | Kato | B60T 8/1766 |
| | | | | 303/186 |
| 7,661,773 | B2* | 2/2010 | Narita | B60T 8/1766 |
| | | | | 303/186 |
| 2002/0185913 | A1 | 12/2002 | Watanabe | |
| 2007/0024114 | A1 | 2/2007 | Narita et al. | |
| 2013/0261922 | A1* | 10/2013 | Takeya | B60T 8/1755 |
| | | | | 701/72 |
| 2015/0217736 | A1* | 8/2015 | Nomura | B60T 7/12 |
| | | | | 701/70 |
| 2016/0236672 | A1* | 8/2016 | Yanagida | B60W 10/06 |
| 2018/0281763 | A1* | 10/2018 | Ohmori | B60W 10/04 |

FOREIGN PATENT DOCUMENTS

| | | |
|---|---|---|
| JP | 2007030797 | 2/2007 |
| WO | 9839187 | 9/1998 |

OTHER PUBLICATIONS

Japanese Office Action in related application No. 2016-067726, dated Oct. 29, 2019, 6 pages.

* cited by examiner

FIG.7

< FIRST MAP >

| | VEHICLE SPEED Vc | | | | |
|---|---|---|---|---|---|
| | V1 | V2 | V3 | V4 | V5 |
| Ath1 | A15 | A14 | A13 | A12 | A11 |

FIG.8

< SECOND MAP >

| | | VEHICLE SPEED Vc | | | | |
|---|---|---|---|---|---|---|
| | | V1 | V2 | V3 | V4 | V5 |
| LATERAL ACCELERATION G | G1 | A9 | A8 | A7 | A6 | A5 |
| | G2 | A8 | A7 | A6 | A5 | A4 |
| | G3 | A7 | A6 | A5 | A4 | A3 |
| | G4 | A6 | A5 | A4 | A3 | A2 |
| | G5 | A5 | A4 | A3 | A2 | A1 |

FIG.9

<THIRD MAP>

|  |  | VEHICLE SPEED Vc | | | | |
|---|---|---|---|---|---|---|
|  |  | V1 | V2 | V3 | V4 | V5 |
| LATERAL ACCELERATION G | G1 | A29 | A28 | A27 | A26 | A25 |
| | G2 | A28 | A27 | A26 | A25 | A24 |
| | G3 | A27 | A26 | A25 | A24 | A23 |
| | G4 | A26 | A25 | A24 | A23 | A22 |
| | G5 | A25 | A24 | A23 | A22 | A21 |

VEHICLE BRAKE CONTROL DEVICE

CROSS-REFERENCE TO RELATED APPLICATION

The present application claims priority under 35 U.S.C. § 119 to Japanese Patent Application No. 2016-067726, filed Mar. 30, 2016. The contents of this application are incorporated herein by reference in their entirety.

FIELD

The present disclosure relates to a brake control device for a vehicle.

In general, as such vehicle brake control devices, a device is known, in which front and rear wheel braking distribution control (hereinafter, also referred to as an "EBD control") is executed if the absolute value of a wheel deceleration of rear wheels exceeds a predetermined value (see Japanese Patent Application Publication No. 2002-362342).

However, in the related art, there is a problem that if rear wheels pass over a hump during braking of a vehicle, the absolute value of a wheel deceleration of the rear wheels is instantly increased and thus the EBD control erroneously intervenes.

SUMMARY

Accordingly, an object of the present disclosure is to suppress erroneous intervention of an EBD control when rear wheels pass over a hump.

In order to solve the above object, a vehicle brake control device according to the present disclosure includes a wheel deceleration calculating unit configured to calculate a wheel deceleration of each of wheels of a vehicle; and a front and rear wheel braking distribution controlling unit configured to execute a front and rear wheel braking distribution control for distributing a braking force on front and rear wheels.

The front and rear wheel braking distribution controlling unit is configured to start the front and rear wheel braking distribution control on front and rear wheels of one of left and right sides if an absolute value of a wheel deceleration of the front wheel is equal to or larger than a first threshold and an absolute value of a wheel deceleration of the rear wheel is equal to or larger than a second threshold.

If the rear wheel passes over a hump during braking of the vehicle, the absolute value of a wheel deceleration of the rear wheel is shapely increased, but the absolute value of a wheel deceleration of the front wheel, which has passed over the hump before then, has a somewhat small stable value. Accordingly, even if the absolute value of the wheel deceleration of the rear wheel becomes equal to or larger than the second threshold when the rear wheel passes over a hump during braking of the vehicle, the absolute value of the wheel deceleration of the front wheel at that time has already had a stable value smaller than the first threshold. Therefore, the EBD control does not intervene. As a result, according to the present disclosure, it is possible to suppress the EBD control from being erroneously started when rear wheels pass over a hump.

Also, in the above configuration, during turning of the vehicle, the front and rear wheel braking distribution controlling unit may be configured to set the first threshold and the second threshold to have a smaller value in a case where the front and rear wheels of the one side correspond to inner turning wheels than a case where the front and rear wheels of the one side correspond to outer turning wheels.

During turning of the vehicle, a load is exerted on the outer turning wheels and the inner turning wheels are likely to slip. Accordingly, it is preferable to early start the EBD control on the inner turning wheels before slipping. In this context, according to the above configuration, the threshold for each of the inner turning wheels is set to have a smaller value. Therefore, the absolute values of wheel decelerations of front and rear wheels on the inner turning side early become equal to or larger than the respective thresholds, and as a result, the EBD control can be early started on the inner turning wheels.

Further, in the above configuration, a lateral acceleration acquiring unit configured to acquire a lateral acceleration may be further provided, and the front and rear wheel braking distribution controlling unit may be configured to set the first threshold and the second threshold to have a smaller value as the lateral acceleration acquired by the lateral acceleration acquiring unit is increased.

Therefore, since the higher the lateral acceleration, the earlier the EBD control can be started, it is possible to enhance stability of the vehicle attitude.

Further, in the above configuration, a vehicle speed calculating unit configured to calculate a vehicle speed may be further provided, and the front and rear wheel braking distribution controlling unit may be configured to set the first threshold and the second threshold to have a smaller value as the vehicle speed acquired by the vehicle speed calculating unit is increased.

Therefore, since the higher the vehicle speed, the earlier the EBD control can be started, it is possible to enhance stability of the vehicle attitude.

According to the present disclosure, it is possible to suppress erroneous intervention of an EBD control when rear wheels pass over a hump.

BRIEF DESCRIPTION OF DRAWINGS

FIG. 7 is a view showing a first map for determining a not-turning threshold.

FIG. 8 is a view showing a second map for determining an inner wheel-side threshold.

FIG. 9 is a view showing a third map for determining an outer wheel-side threshold.

DETAILED DESCRIPTION OF EMBODIMENTS

Hereinafter, exemplary embodiments of the present disclosure will be described in detail, appropriately referring to the accompanying drawings.

Figure 1:
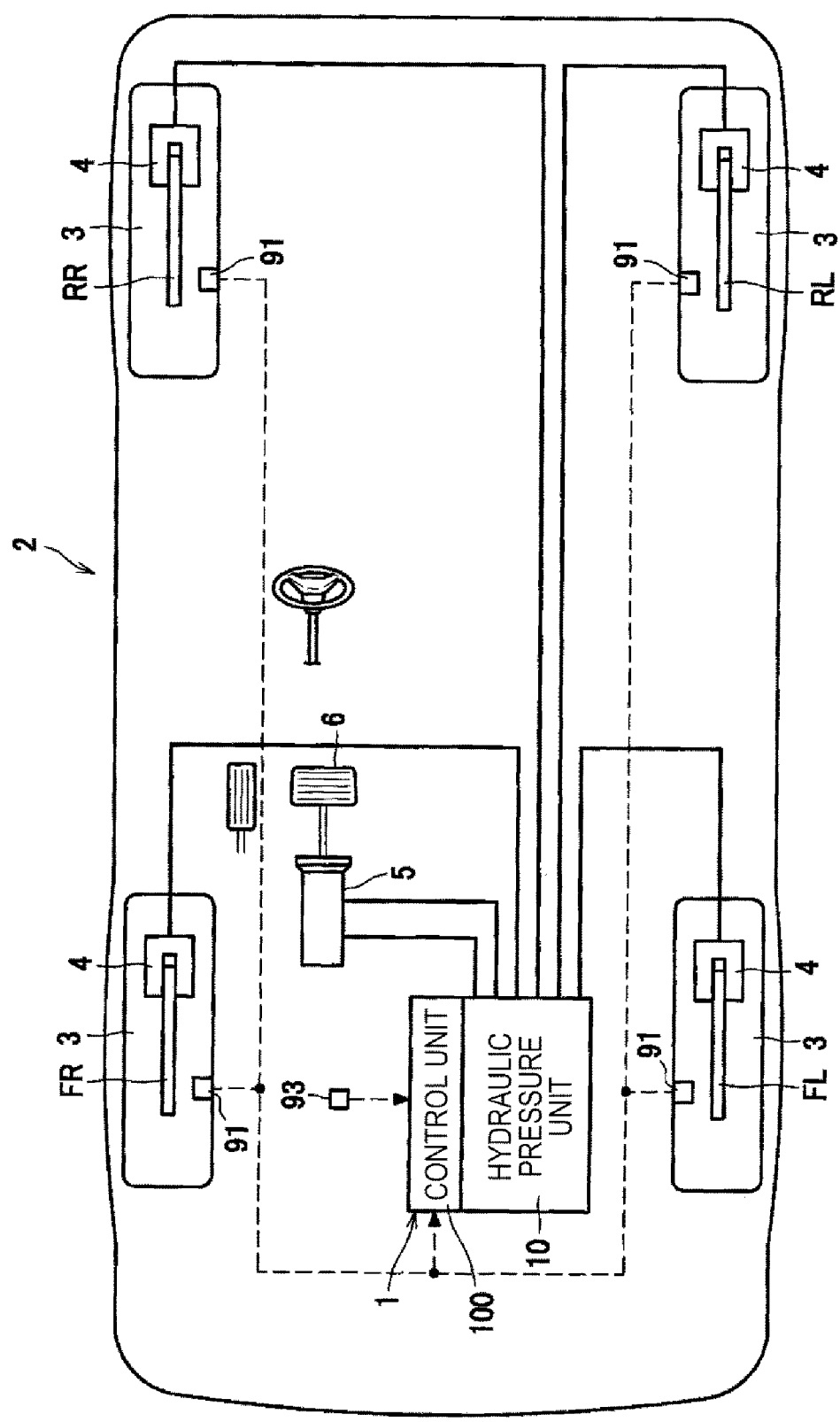
FIG. 1 is a configuration view of a vehicle having a vehicle brake hydraulic pressure control device according to an embodiment of the present disclosure.

As shown in FIG. 1, a vehicle bake hydraulic pressure control device 1 as one example of a vehicle brake control device is a device intended to properly control a braking force to be imparted to each of wheels 3 of a vehicle. The vehicle brake hydraulic pressure control device 1 mainly includes a hydraulic pressure unit 10 provided with fluid paths or various components, and a control unit 100 for properly controlling various components in the hydraulic pressure unit 10.

Each of the wheels 3 is equipped with wheel brakes FL, RR, RL, FR, respectively, and each of wheel brakes FL, RR, RL. FR is equipped with a wheel cylinder 4 for generating a braking force by a hydraulic pressure supplied from a master cylinder 5 as a hydraulic pressure source. Each of the master cylinder 5 and the wheel cylinder 4 is connected to the hydraulic pressure unit 10. Also, a hydraulic pressure, which is generated by the master cylinder 5 in accordance with a tread force (braking operation of a driver) on a brake pedal 6, is controlled in the control unit 100 and the hydraulic unit 10 and then supplied to the wheel cylinders 4.

To the control unit 100, wheel speed sensors 91 for detecting a wheel speed of each wheel 3 and a lateral acceleration sensor 93 for detecting a lateral acceleration exerted on the vehicle 2 are connected. In addition, the control unit 100 has, for example, CPU (Central Processing Unit), RAM (Random Access Memory), ROM (Read Only Memory) and input/output circuits, and is configured to execute control by executing various arithmetic processing based on inputs from the wheel speed sensors 91, the lateral acceleration sensor 93 and the like and also on programs or data stored in the ROM. Meanwhile, details of the control unit 100 will be described below: Meanwhile, details of the control unit 100 will be described below.

Figure 2:
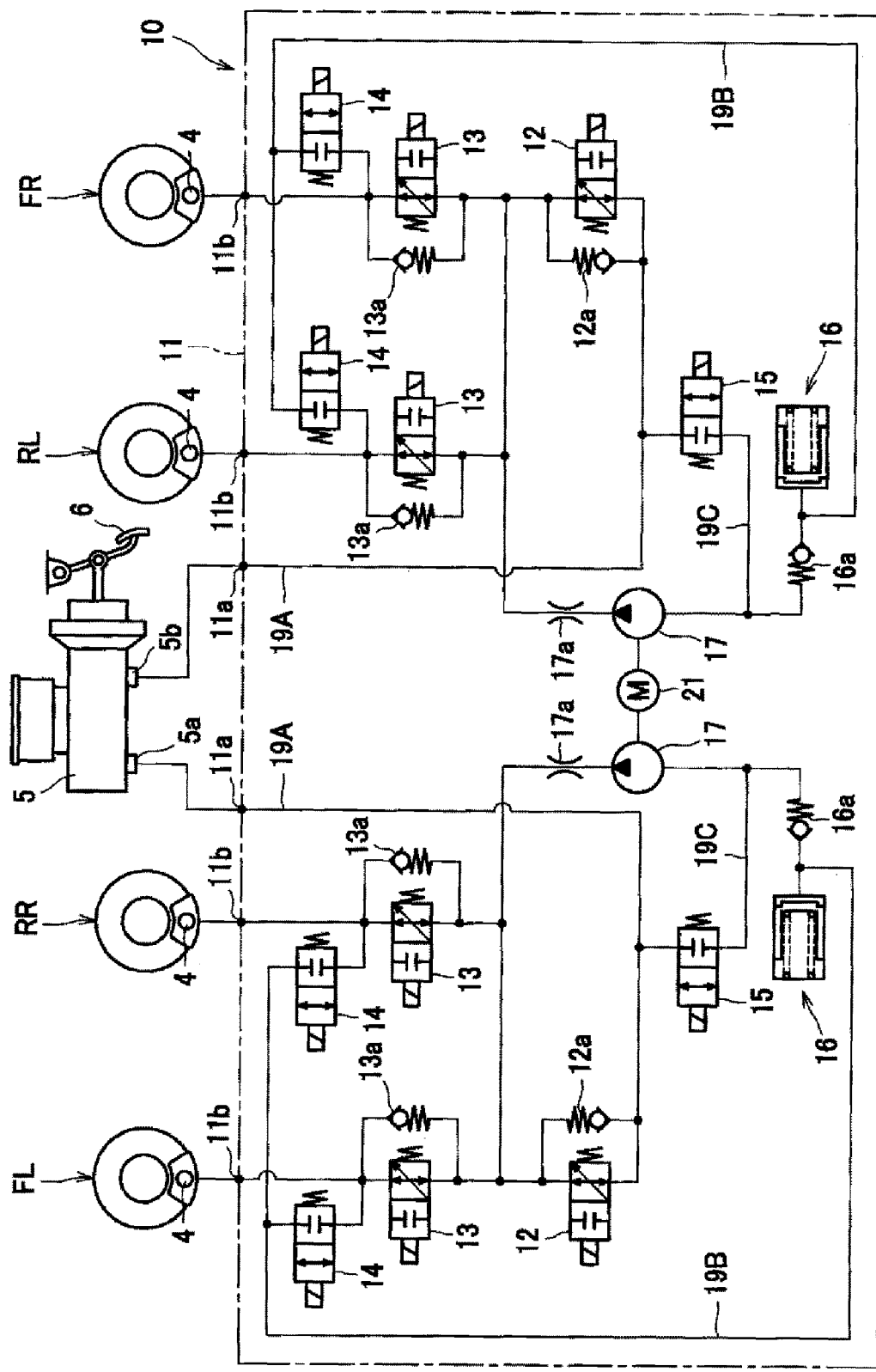
FIG. 2 is a configuration view showing a configuration of a hydraulic pressure unit.

As shown in FIG. 2, the hydraulic pressure unit 10 is arranged between the master cylinder 5, which is configured to generate a brake hydraulic pressure in accordance with a tread force exerted on the brake pedal 6 by a driver, and wheel brakes FR, FL, RR, RL.

The hydraulic pressure unit 10 is configured such that fluid paths and various solenoid valves are arranged in a pump body 11 as a base body having fluid paths (hydraulic pressure paths), through which a brake fluid flows. Output ports 5a. 5b of the master cylinder 5 are connected to input ports 11a of the pump body 11, and output ports 11b of the pump body 11 are connected to the respective wheel brakes FL, RR, RL, FR. In a normal state, a fluid path for communicating the input ports 11a with the output ports 11b is formed in the pump body 11, so that a tread force on the brake pedal 6 is transferred to each of the wheel brakes FL, RR, RL, FR. Meanwhile, a hydraulic pressure line connected to the output port 5a of the master cylinder 5 is connected to the wheel brakes FL, RR, and a hydraulic pressure line connected to the output port 5b of the master cylinder 5 is connected to the wheel brakes RL, FR. These lines have generally the same configuration.

In each hydraulic pressure line, a pressure regulation valve 12, which is a normal-open proportional solenoid valve capable of regulating a difference between hydraulic pressures on upstream and downstream sides in accordance with an electric current supplied thereto, is provided on a hydraulic pressure path connecting the input port 11a with the output ports 11b. In the pressure regulation valve 12, a check valve 12a configured to allow only a flow toward the output ports 11b is provided in parallel thereto.

Hydraulic pressure paths, which are located closer to the wheel brakes FL, RR, RL, FR than the pressure regulation valves 12, are divided midway to be connected to the respective output ports 11b. On each of hydraulic pressure paths corresponding to the respective output ports 11b, an inlet valve 13, which is a normal-open proportional solenoid valve, is arranged. In each inlet valve 13, a check valve 13a configured to allow only a flow toward the pressure regulation valve 12 is provided in parallel thereto.

A recirculation hydraulic pressure path 19B is provided to be connected from between each of the output ports 11b and the inlet valve 13 corresponding thereto to between the pressure regulation valve 12 and the inlet valve 13 via an output valve 14, which consists of a normal-close solenoid valve 14.

On the recirculation hydraulic pressure path 19B, a reservoir 16 for temporarily absorbing an excess brake fluid, a check valve 16a, a pump 17 and an orifice 17a are arranged in this order from the output valve 14 side. The check valve 16a is arranged to allow only a flow toward between the pressure regulation valve 12 and the inlet valve 13. The pump 17 is driven by a motor 21 and is provided to generate a pressure toward between the pressure regulation valve 12 and the inlet valve 13. The orifice 17a is configured to reduce pulsation of a pressure of a brake fluid discharged from the pump 17 and pulsation generated due to operation of the pressure regulation valve 12.

An introduction hydraulic pressure path 19A, which connects the input port 11a with the pressure regulation valve 12, and a portion of the recirculation hydraulic pressure path 19B, which is located between the check valve 16a and the pump 17 are connected to each other by an intake hydraulic pressure path 19C. On the intake hydraulic pressure path 19C, an intake valve 15, which is a normal-close solenoid valve, is arranged.

According to the hydraulic pressure unit 10 configured as described above, in a normal state, electric current is not supplied to each of the solenoid valves, and thus a brake hydraulic pressure introduced from the input port 11a is outputted to the output ports 11b through the pressure regulation vale 12 and the inlet valve 13 and thus is intactly imparted to each wheel cylinder 4. Also, in the case of decreasing an excess brake hydraulic pressure of a wheel cylinder 4, such as where an anti-lock brake control is executed thereon, the corresponding inlet valve 13 is closed and the corresponding outlet valve 14 is opened, thereby allowing the brake fluid to flow to the reservoir 16 through the recirculation hydraulic pressure path 19B and thus extracting the brake fluid from the wheel cylinder 4. Further, in the case of applying a pressure to the wheel cylinder 4 when there is no operation of the brake pedal 6 by a driver, the intake valve 15 is opened and the motor 21 is driven, thereby allowing the brake fluid to be actively supplied to the wheel cylinder 4 by a pressure applied by the pump 17. Further, in the case of desiring to adjust the extent of a pressure applied to the wheel cylinder 4, this is done by adjusting an electric current to be flowed to the pressure regulation valve 12.

Next, details of the control unit 100 will be described.

Figure 3:
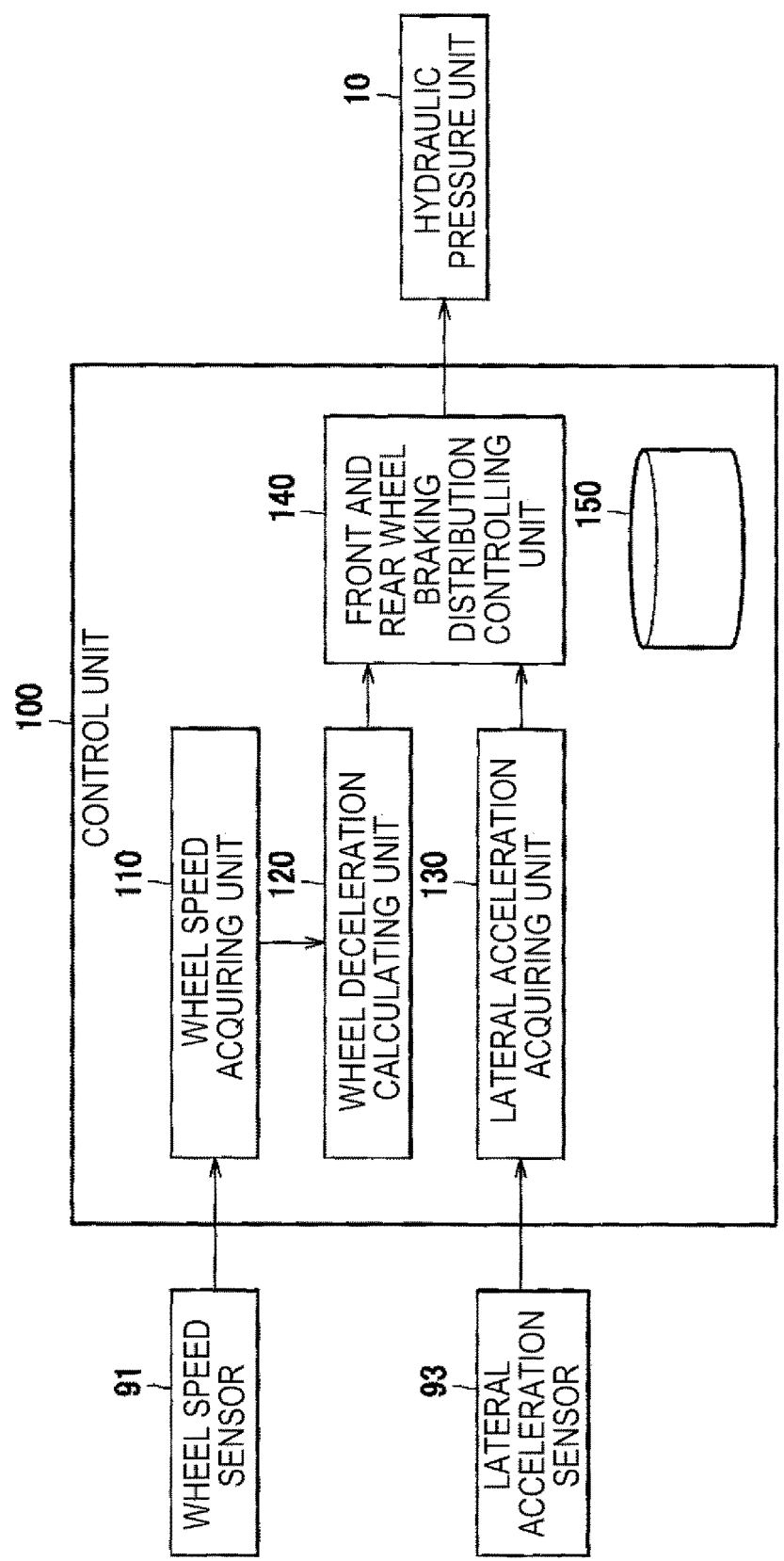
FIG. 3 is a block diagram showing a configuration of a control unit.

As shown in FIG. 3, the control unit 100 includes a wheel speed acquiring unit 110, a wheel deceleration calculating unit 120, a lateral acceleration acquiring unit 130, a front and rear wheel braking distribution controlling unit 140 and a memory unit 180.

The wheel speed acquiring unit 110 has a function of acquiring a wheel speed of each of the wheels 3 from the respective wheel speed sensors 91. If the wheel speed of each wheel 3 is acquired, the wheel speed acquiring unit 110 outputs the acquired wheel speed to the wheel deceleration calculating unit 120.

The wheel deceleration calculating unit 120 has a function of calculating a wheel deceleration Aw of each wheel 3 based on the wheel speed of each wheel 3. If the wheel deceleration Aw of each wheel 3 is calculated, the wheel deceleration calculating unit 120 outputs the calculated wheel deceleration Aw to the front and rear wheel braking distribution controlling unit 140. Herein, the wheel deceleration Aw has the same meaning as a wheel acceleration, and accordingly a negative value thereof represents that the wheel 3 is being decelerated and a positive value thereof represents that the wheel 3 is being accelerated.

The lateral acceleration acquiring unit 130 has a function of acquiring a lateral acceleration from the lateral acceleration sensor 93. If the lateral acceleration is acquired, the lateral acceleration acquiring unit 130 outputs the acquired lateral acceleration to the front and rear wheel braking distribution controlling unit 140.

The front and rear wheel braking distribution controlling unit 140 has a function of executing a front and rear wheel braking distribution control (hereinafter, also referred to as an "EBD control") for distributing a braking force on front and rear wheels based on the wheel deceleration Aw of each wheel 3. Specifically, the front and rear wheel braking distribution controlling unit 140 decides whether or not conditions for starting of the EBD control on each of the left front and rear wheels and the right front and rear wheels are satisfied, and if the starting condition is satisfied, executes the EBD control on a rear wheel on the side, on which the starting condition is satisfied Meanwhile, the conditions for starting of the EBE control will be described in detail. Also, as the EBD control, a control for holding a brake hydraulic pressure of the rear wheel by closing the inlet valve 13 corresponding to the rear wheel may be employed.

Also, during the EBD control, the front and rear wheel braking distribution controlling unit 140 ends the EBD control if conditions for ending of the EBD control are satisfied. Meanwhile, the condition for ending of the EBD control may include release of operation of the brake and the like.

Next, the condition for starting of the EBD control will be described.

The front and rear wheel braking distribution controlling unit 140 is configured to start the EBD control on front and rear wheels of one of left and right sides if both of the absolute values of wheel decelerations Aw of the front and rear wheels thereof are equal to or larger than a predetermined threshold Ath. Meanwhile, although in the present embodiment, the same threshold Ath is used for both front and rear wheels, the present disclosure is not limited thereto. A threshold for the front wheel may be set to a first threshold, and a threshold for the rear wheel may be set to a second threshold, which is different from the first threshold.

The front and rear wheel braking distribution controlling unit 140 has a function of deciding whether or not the vehicle 2 is turning based on a lateral acceleration G and then changing the threshold Ath depending on whether or not the vehicle 2 is turning. Specifically, the front and rear wheel braking distribution controlling unit 140 decides that the vehicle 2 is turning, if the lateral acceleration G is equal to or higher than a predetermined value G1, and decides that the vehicle 2 is not turning, if the lateral acceleration G is smaller than a predetermined value (G<G1).

If it is decided that the vehicle 2 is not turning, the front and rear wheel braking distribution controlling unit 140 sets the threshold Ath to a not-turning threshold Ath1. Also, if it is decided that the vehicle 2 is turning, the front and rear wheel braking distribution controlling unit 140 sets a threshold Ath corresponding to front and rear wheels, which become inner wheels upon turning, to an inner wheel-side threshold Ath2, and also sets a threshold Ath corresponding to front and rear wheels, which become outer wheels, to an outer wheel-side threshold Ath3. A relationship of magnitudes of the thresholds Ath1 to Ath3 is set to Ath2<Ath1<Ath3.

Meanwhile, decision on inner wheel/outer wheel can be properly performed depending on a direction of the lateral acceleration sensor 93 and whether or not the lateral acceleration G is positive or negative. For example, in the case where the lateral acceleration sensor 93 is arranged in such a direction that a positive lateral acceleration G is detected upon right turning of the vehicle 2, the front and rear wheel braking distribution controlling unit 140 decides that the vehicle 2 is turning right, when a positive lateral acceleration G is acquired from the lateral acceleration sensor 93, and thus decides that the right front and left wheels are inner wheels and the left front and rear wheels are outer wheels. Also, the front and rear wheel braking distribution controlling unit 140 decides that the vehicle 2 is turning left, when a negative lateral acceleration G is acquired from the lateral acceleration sensor 93, and thus decides that the right front and left wheels are outer wheels and the left front and rear wheels are inner wheels In the memory unit 150, the thresholds Ath1 to Ath3 and the like are stored. Meanwhile, the thresholds Ath1 to Ath3 may be appropriately set by experiments, simulations and the like.

Next, operation of the control unit 100 will be described in detail.

The control unit 100 is configured to repeatedly execute a flow chart shown in FIG. 1 during braking of the vehicle 2.

Figure 4:
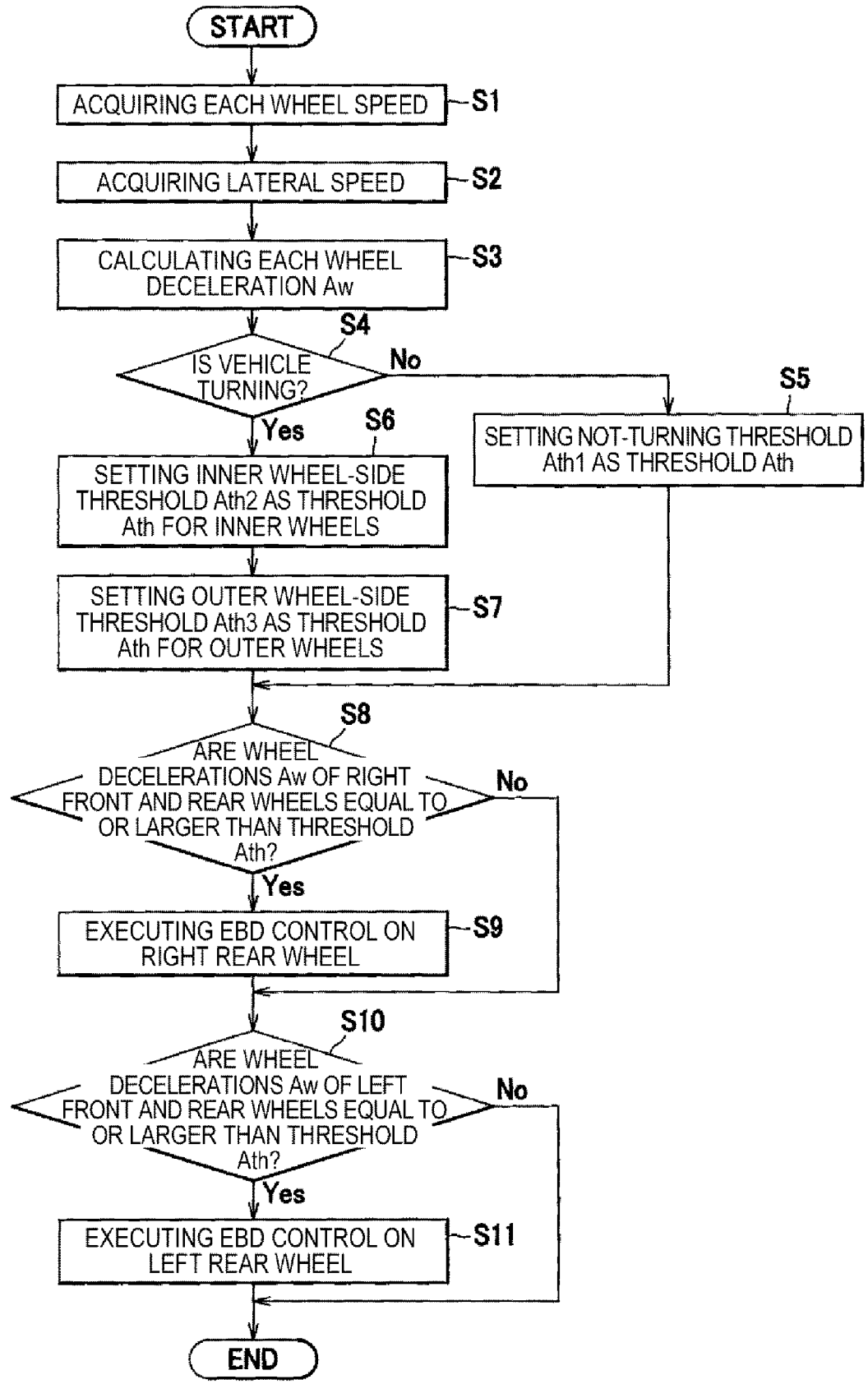
FIG. 4 is a flow chart showing operation of the control unit.

As shown in FIG. 4, if a driver steps on the brake pedal 6 (START), first, the control unit 100 acquires a wheel speed of each of wheels 3 from the respective wheel speed sensors 91 (S1) and also acquires a lateral acceleration G from the lateral acceleration sensor 93 (S2). After the step S2, the control unit 100 calculates a wheel deceleration Aw of each of the wheels 3, based on the wheel speed (S3).

After the step S3, the control unit 100 decides whether or not the vehicle 2 is turning, based on the lateral acceleration G (S4). In the step S4, if it is decided that the vehicle 2 is not turning (No), the control unit 100 sets both of a threshold Ath for left front and rear wheels and a threshold Ath for right front and rear wheels to a not-turning threshold Ath1 (S5).

In the step S4, if it is decided that the vehicle 2 is turning (Yes), the control unit 100 sets a threshold Ath for front and rear wheels, which become inner wheels, to an inner wheel-side threshold Ath2 (S6). After the step S6, the control unit 100 sets a threshold Ath for front and rear wheels, which become outer wheels, to an outer wheel-side threshold Ath3 (S7).

After the step S5 or S7, the control unit 100 decides whether or not both of the absolute values of wheel decelerations Aw of the right front and rear wheels are equal to or larger than the threshold Ath (S8). In the step S8, if it is decided that both of the absolute values of wheel decelerations Aw of the right front and rear wheels are equal to or larger than the threshold Ath (Yes), the control unit 100 executes the EBD control on the right rear wheel (S9).

After the step S9 or if No in the step S8, the control unit 100 decides whether or not both of the absolute values of wheel decelerations Aw of the left front and rear wheels are equal to or larger than the threshold Ath (S10). In the step S10, if it is decided that both of the absolute values of wheel decelerations Aw of the left front and rear wheels are equal to or larger than the threshold Ath (Yes), the control unit 100 executes the EBD control on the left rear wheel (S11). After the step S11 or if No in the step S10, the control unit 100 ends the present control.

Next, one example of control by the control unit 100 will be described with reference to FIG. 5.

Figure 5:
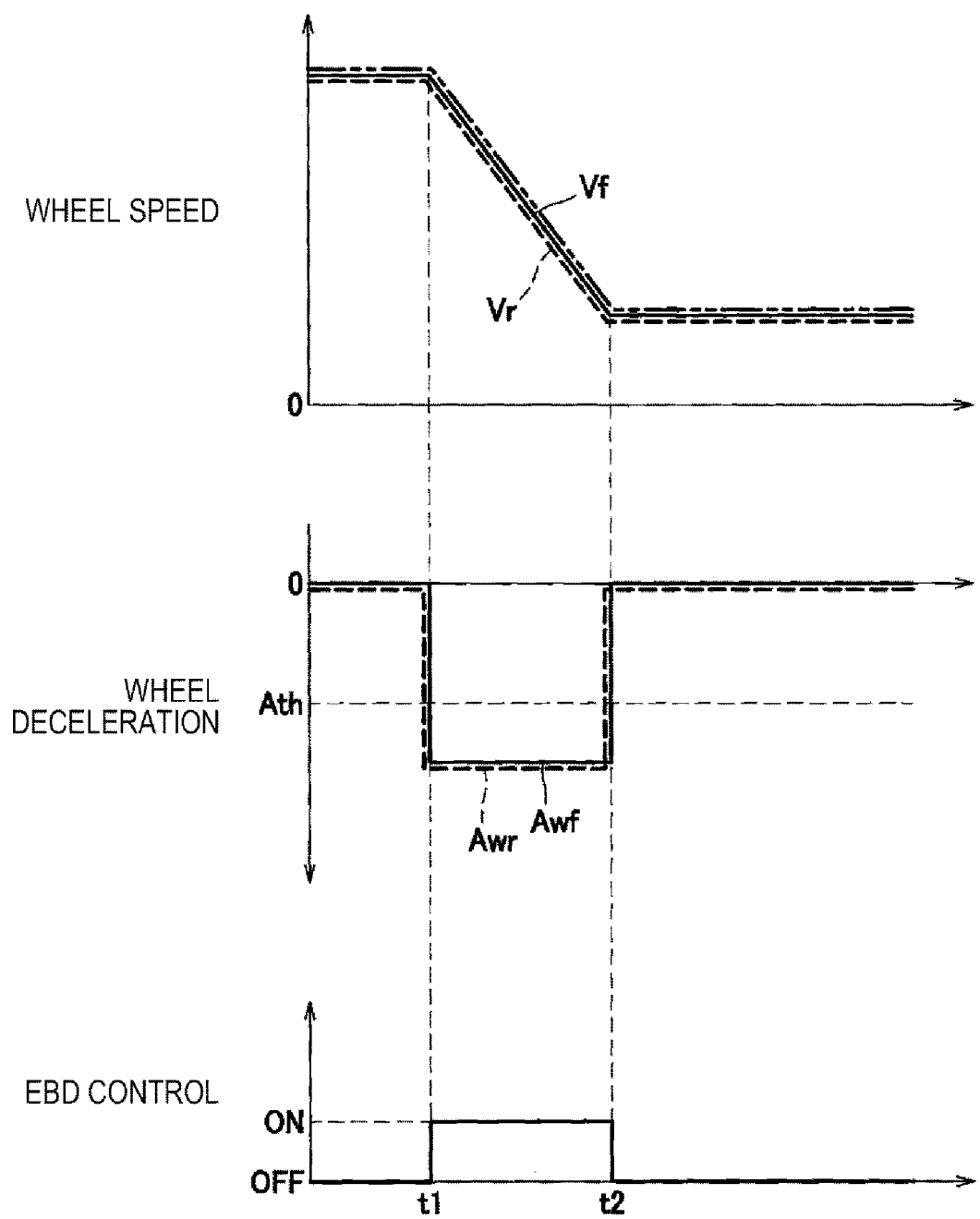
FIG. 5 is a time chart showing fluctuation of each of parameters while an EPD control is executed.

As shown in FIG. 5, when a driver relatively strongly steps on the brake pedal 6 (time t1), both of a wheel speed Vf of front wheels and a wheel speed Vr of rear wheels decrease with a relatively large gradient. Meanwhile, in the figure, a two-dot chain line represents a vehicle speed.

When both of the wheel speeds Vf, Vr decrease with a large gradient as described above, both of the absolute values of wheel decelerations Awf, Awr of the front and rear wheels become larger than the threshold Ath. Therefore, the condition for starting of the EBD control is satisfied and thus the EBD control is started at time t1. On the other hand, for example, when operation of the brake by the driver is released thereafter (time t2), the EBD control is ended.

Figure 6:
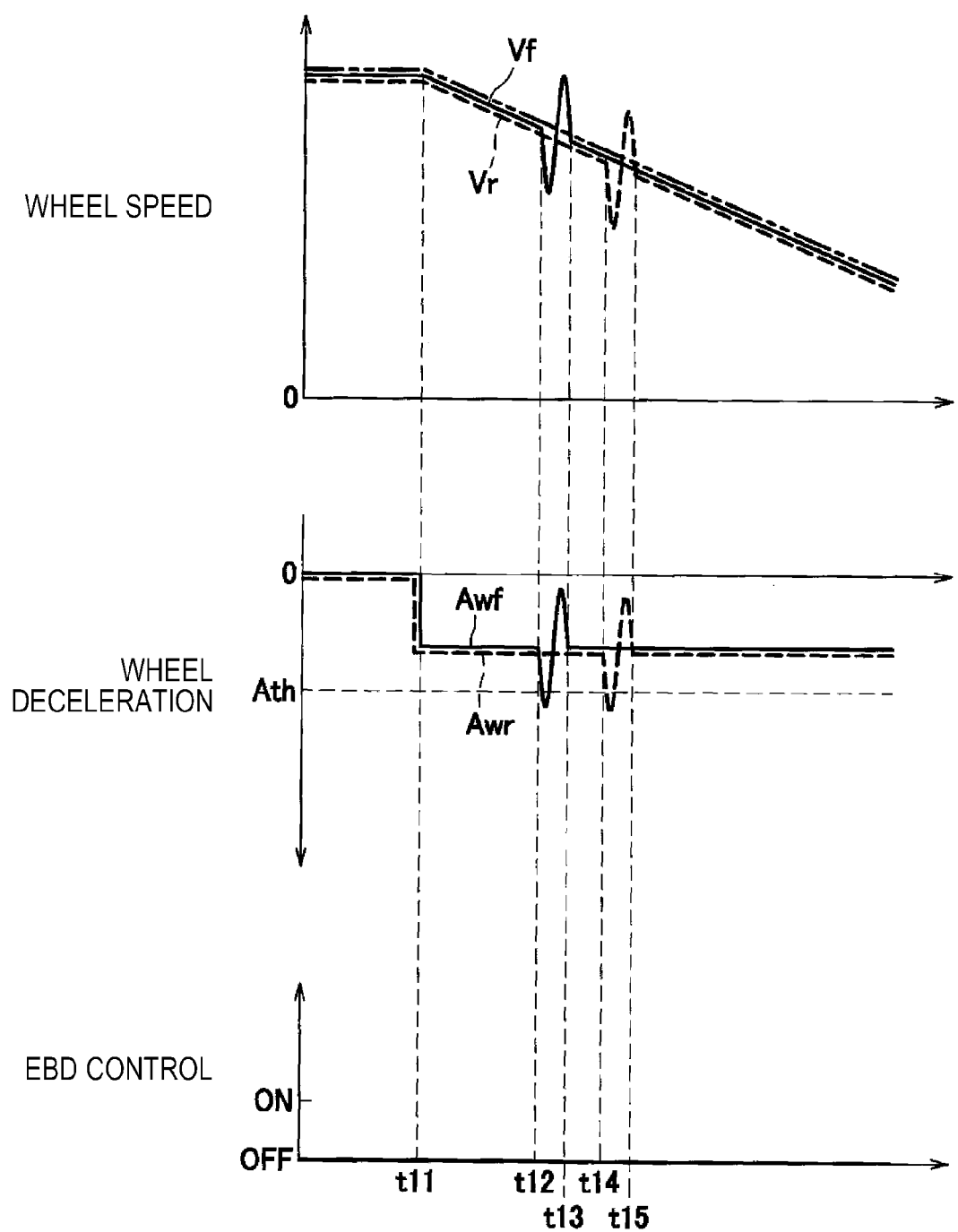
FIG. 6 is a time chart showing fluctuation of each of parameters while the EPD control is not executed in the case where rear wheels pass over a hump.

In contrast, as shown in FIG. 6, when the driver lightly steps on the brake pedal 6 as compared with the case of FIG. 5 (time t11), both of the wheel speeds Vf, Vr of the front and rear wheels decrease with a gradient smaller than the case of FIG. 5. Therefore, both of the absolute values of wheel decelerations Awf. Awr of the front and rear wheels become smaller than the threshold Ath.

Thereafter, if the front wheels pass over a hump (time t12 to t13), the wheel speed Vf of the front wheels largely fluctuates up and down, and thus the wheel deceleration Awf of the front wheels also largely fluctuates up and down. Therefore, although the absolute value of the wheel deceleration Awf of the front wheels instantly becomes larger than the threshold Ath, the absolute value of the wheel deceleration Awr of the rear wheels has a generally constant stable value smaller than the threshold Ath, because the rear wheels don't yet reach the hump at that time. As a result, the condition for starting of the EBD control is not satisfied and thus the EBD control is not started.

Thereafter, if the rear wheels pass over the hump (time t12 to t13), the wheel speed Vr of the rear wheels largely fluctuates up and down, and thus the wheel deceleration Awr of the rear wheels also largely fluctuates up and down. Therefore, although the absolute value of the wheel deceleration Awr of the rear wheels instantly becomes larger than the threshold Ath, the absolute value of the wheel deceleration Awf of the front wheels has a generally constant stable value smaller that the threshold Ath, because the front wheels have already passed over the hump at that time. As a result, the condition for starting of the EBD control is not satisfied and thus the EBD control is not started.

In this case, according to the conventional decision method, whether or not the absolute value of a wheel deceleration of the rear wheels has become equal to or larger than a threshold is only a condition. Accordingly, when the rear wheels pass over a hump (time t14 to t15), the EBD control is erroneously started. In contrast, according to the present embodiment, both of the wheel decelerations Awf, Awr of the front and rear wheels are compared with the threshold Ath. As a result, it is possible to suppress erroneous intervention of the EBD control when the rear wheels pass over the hump.

According to the present embodiment, the following effects can be achieved in addition to the above effect.

During turning of the vehicle 2, a load is exerted on outer turning wheels, and inner turning wheels are likely to slip. Accordingly, it is preferable to early start the EBD control on the inner turning wheels before slipping. In this context, according to the present embodiment, the inner wheel-side threshold Ath2 is set to be smaller than the outer wheel-side threshold Ath3. Therefore, the absolute values of wheel decelerations Aw of front and rear wheels, which become the inner turning wheels, early become equal to or larger than the inner wheel-side threshold Ath2, and as a result, the EBD control can be early started on the inner turning wheels. In addition, according to the present embodiment, the inner wheel-side threshold Ath2 has a value smaller that the not-turning threshold Ath1. Therefore, the EBD control can be more early started on inner wheels upon turning than the case of not-turning.

Meanwhile, the present disclosure is not limited to the foregoing embodiments, but can be used in various forms as illustrated below. In the following description, members having generally the same structure as those of the foregoing embodiments are designated by the same reference numerals, and the description thereof will be omitted.

Although in the foregoing embodiment, the not-turning threshold Ath1, the inner wheel-side threshold Ath2 and the outer wheel-side threshold Ath3 have fixed values, each of the thresholds Ath1 to Ath3 may be appropriately changed in accordance with conditions. For example, the front and rear wheel braking distribution controlling unit 140 may be configured to change the not-turning threshold Ath1 in accordance with a vehicle speed Vc based on a first map as shown in FIG. 7. Specifically, as the vehicle speed Vc is increased (e.g., V1→V2), the not-turning threshold Ath1 may be set to have a smaller value (e.g., A15→A14). Herein, in FIG. 7 and also FIGS. 8 and 9 as described below, the higher the number attached to the alphabetical symbols (V, A, G), the larger the value thereof is. In this case, the control unit 100 may be provided with a vehicle speed calculating unit for calculating the vehicle speed Vc based on wheel speeds.

Therefore, since the higher the vehicle speed Vc, the earlier the EBD control can be started, it is possible to enhance stability of the vehicle attitude.

Also, the front and rear wheel braking distribution controlling unit 140 may be configured to appropriately change the inner wheel-side threshold Ath2 in accordance with the vehicle speed Vc and the lateral acceleration G, based on a second map as shown in FIG. 8. Specifically, as the vehicle speed Vc is increased (e.g., V1→V2), the inner wheel-side threshold Ath2 may be set to have a smaller value (e.g., A9→A8) and also as the lateral acceleration G is increased (e.g., G4→G5), the inner wheel-side threshold Ath2 may be set to have a smaller value (e.g., A6→A5).

Therefore, since the higher the vehicle speed Vc or the lateral acceleration G, the earlier the EBD control can be started, it is possible to enhance stability of the vehicle attitude.

Further, the front and rear wheel braking distribution controlling unit 140 may be configured to appropriately change the outer wheel-side threshold Ath3 in accordance with the vehicle speed Vc and the lateral acceleration G, based on a third map as shown in FIG. 9. Specifically, as the vehicle speed Vc is increased (e.g., V1→V2), the outer wheel-side threshold Ath3 may be set to have a smaller value (e.g., A29→A28) and also as the lateral acceleration G is increased (e.g., G4→G5), the outer wheel-side threshold Ath3 may be set to have a smaller value (e.g., A26→A25).

Therefore, since the higher the vehicle speed Vc or the lateral acceleration G, the earlier the EBD control can be started, it is possible to enhance stability of the vehicle attitude.

Figure 10:
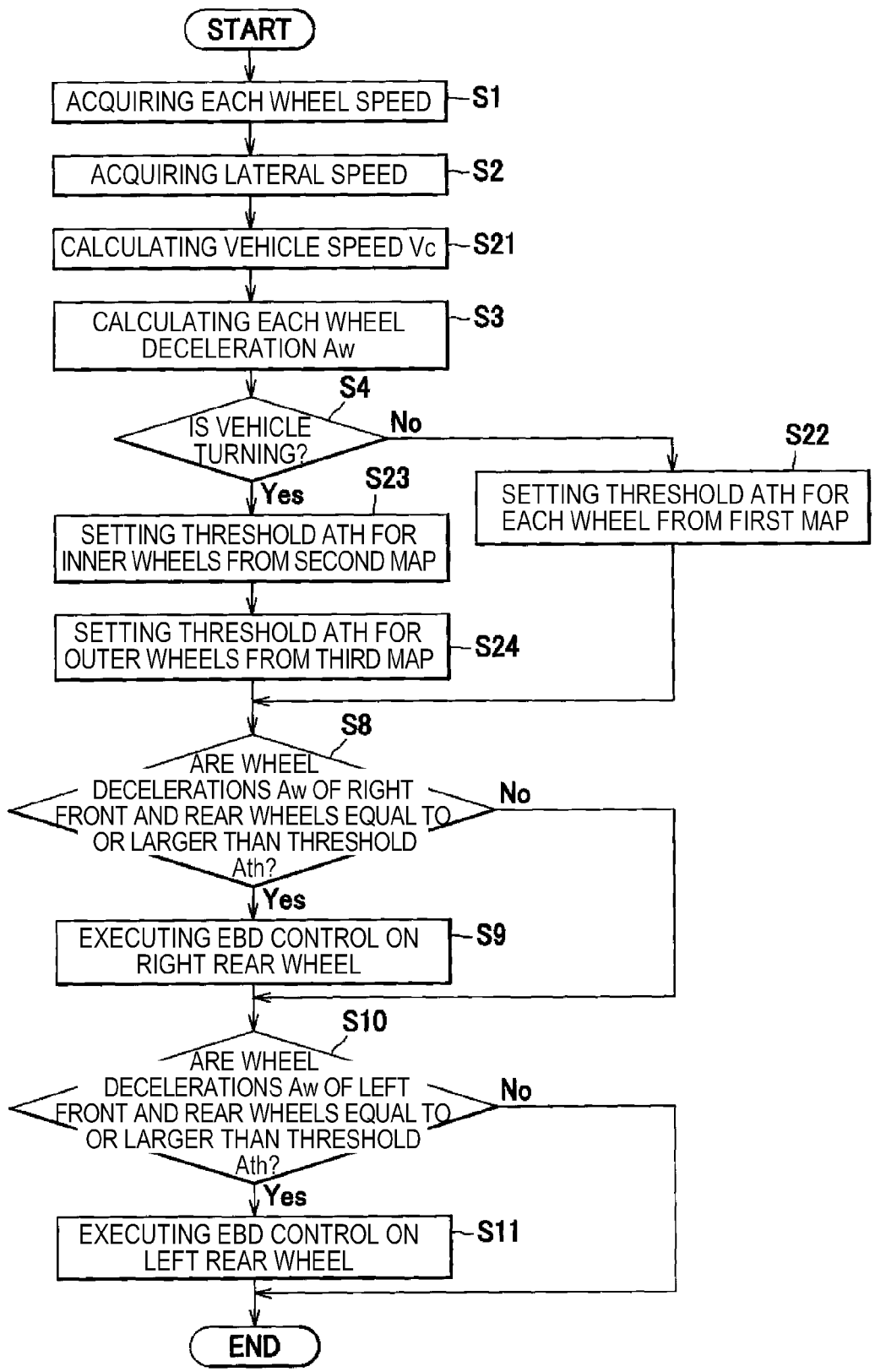
FIG. 10 is a flow chart showing a variant of operation of the control unit.

In order to set the threshold Ath with reference to each of the maps as described above, the control unit 100 may be operated based on a flow chart as shown in FIG. 10. In the flow chart of FIG. 10, a new step S21 is provided between the step S2 and the step S3 in the flow chart of FIG. 4, and also new steps 22 to 24 are provided instead of steps S5 to S7 in the flow chart of FIG. 4. Processing in the new steps S21 to S24 will be described in detail below.

In the step 21, the control unit 100 calculates a vehicle speed Vc based on wheel speeds. If in the step S4, it is decided that the vehicle is not turning, specifically that the lateral acceleration G is not equal to or higher than G1 (No), the control unit 100 proceeds to the step S22.

In the step S22, the control unit 100 determines a not-turning threshold Ath1 based on the first map (see FIG. 7) and the vehicle speed Vc and then sets the determined not-turning threshold Ath1 as a threshold Ath for each of wheels 3. Specifically, for example, if the vehicle speed Vc is V3, in the step S22, the control unit 100 determines A13 as the not-turning threshold Ath1 and then sets A13 as the threshold Ath for each of wheels 3.

If in the step S4, it is decided that the vehicle is turning, specifically that the lateral acceleration G is equal to or higher than G1 (Yes), the control unit 100 determines an inner wheel-side threshold Ath2 based on the second map (see FIG. 8), the vehicle speed Vc and the lateral acceleration G and then sets the determined inner wheel-side threshold Ath2 as a threshold Ath for inner wheels (S23). Specifically, for example, if the vehicle speed Vc is V3 and the lateral acceleration G is G3, the control unit 100 determines A5 as the inner wheel-side threshold Ath2 and then sets A5 as the threshold Ath for the inner wheels.

After the step 23, the control unit 100 determines an outer wheel-side threshold Ath3 based on the third map (see FIG. 9), the vehicle speed Vc and the lateral acceleration G and then sets the determined outer wheel-side threshold Ath3 as a threshold Ath for outer wheels (S24). Specifically, for example, if the vehicle speed Vc is V3 and the lateral acceleration G is G3, the control unit 100 determines A25 as the outer wheel-side threshold Ath3 and then sets A25 as the threshold Ath for the outer wheels.

Due to the above configurations, the threshold Ath can be suitably set for the case where the vehicle 2 is turning or not turning and also in accordance with magnitudes of the vehicle speed Vc and the lateral acceleration G.

Although in the foregoing embodiments, the present disclosure is applied to the vehicle brake hydraulic pressure control device 1 for controlling a brake hydraulic pressure, the present disclosure is not limited thereto. For example, the present disclosure may be applied to a vehicle brake control device for controlling an electric brake device, which is configured to generate a braking force by an electric motor.

Also, although in the foregoing embodiments, processing in the flow chart (see FIG. 4) is executed in order from the right wheels (S8, S9) to the left wheels (S10, S11), the present disclosure is not limited thereto. For example, whether or not both of the absolute values of wheel decelerations Aw of front and rear wheels are equal to or larger than the threshold Ath may be simultaneously decided on both of the left and right sides (S8 and S10 may be simultaneously processed), and then the EBD control may be executed on a rear wheel on a side, which corresponds thereto, of the left and right sides.

The invention claimed is:

1. A vehicle brake control device comprising:
   a wheel deceleration calculating unit configured to calculate a wheel deceleration of each of wheels of a vehicle;
   and a front and rear wheel braking distribution controlling unit configured to execute a front and rear wheel braking distribution control for distributing a braking force on front and rear wheels,
   wherein the front and rear wheel braking distribution controlling unit is configured to start the front and rear wheel braking distribution control on front and rear wheels of one of left and right sides if an absolute value of a wheel deceleration of the front wheel is equal to or larger than a first threshold and an absolute value of a wheel deceleration of the rear wheel is equal to or larger than a second threshold, wherein the first threshold is different from the second threshold,
   wherein the front and rear wheel braking distribution controlling unit decides that the vehicle is turning if the lateral acceleration is equal to or higher than a predetermined value G1, and decides that the vehicle is not turning, if the lateral acceleration G is smaller than a predetermined value G<G1.

2. The vehicle brake control device according to claim 1, wherein during turning of the vehicle, the front and rear wheel braking distribution controlling unit is configured to set the first threshold and the second threshold to have a smaller value in a case where the front and rear wheels of the one side correspond to inner turning wheels than a case where the front and rear wheels of the one side correspond to outer turning wheels.

3. The vehicle brake control device according to claim 2 further comprising a lateral acceleration acquiring unit configured to acquire a lateral acceleration,
   wherein the front and rear wheel braking distribution controlling unit is configured to set the first threshold and the second threshold to have a smaller value as the lateral acceleration acquired by the lateral acceleration acquiring unit is increased.

4. The vehicle brake control device according to claim 1 further comprising a vehicle speed calculating unit configured to calculate a vehicle speed,
   wherein the front and rear wheel braking distribution controlling unit is configured to set the first threshold and the second threshold to have a smaller value as the vehicle speed acquired by the vehicle speed calculating unit is increased.

5. The vehicle brake control device according to claim 2 further comprising a vehicle speed calculating unit configured to calculate a vehicle speed,
   wherein the front and rear wheel braking distribution controlling unit is configured to set the first threshold and the second threshold to have a smaller value as the vehicle speed acquired by the vehicle speed calculating unit is increased.

6. The vehicle brake control device according to claim 3 further comprising a vehicle speed calculating unit configured to calculate a vehicle speed,
   wherein the front and rear wheel braking distribution controlling unit is configured to set the first threshold and the second threshold to have a smaller value as the vehicle speed acquired by the vehicle speed calculating unit is increased.

7. The vehicle brake control device according to claim 1,
wherein the front and rear wheel braking distribution controlling unit decides whether or not the vehicle is turning based on a lateral acceleration and then changing the first threshold and the second threshold depending on whether or not the vehicle is turning.

8. A vehicle brake control device comprising:
a wheel deceleration calculating unit configured to calculate a wheel deceleration of each of wheels of a vehicle; and
a front and rear wheel braking distribution controlling unit configured to execute a front and rear wheel braking distribution control for distributing a braking force on front and rear wheels,
wherein the front and rear wheel braking distribution controlling unit is configured to start the front and rear wheel braking distribution control on front and rear wheels of one of left and right sides if an absolute value of a wheel deceleration of the front wheel is equal to or larger than a first threshold and an absolute value of a wheel deceleration of the rear wheel is equal to or larger than a second threshold,
wherein the front and rear wheel braking distribution controlling unit decides whether or not the vehicle is turning based on a lateral acceleration and then changing the first threshold and the second threshold depending on whether or not the vehicle is turning,
wherein the front and rear wheel braking distribution controlling unit decides that the vehicle is turning if the lateral acceleration is equal to or higher than a predetermined value G1, and decides that the vehicle is not turning, if the lateral acceleration G is smaller than a predetermined value G<G1,
wherein when it is decided that the vehicle is not turning, the front and rear wheel braking distribution controlling unit sets a threshold to a not-turning threshold Ath1,
wherein when it is decided that the vehicle is turning, the front and rear wheel braking distribution controlling unit sets the threshold corresponding to the front and rear wheels, which become inner wheels upon turning, to an inner wheel-side threshold Ath2, and also sets the threshold corresponding to the front and rear wheels, which become outer wheels, to an outer wheel-side threshold Ath3, and
wherein a relationship of magnitudes of the thresholds Ath1 to Ath3 is set to Ath2<Ath1<Ath3.

9. The vehicle brake control device according to claim 8,
wherein during turning of the vehicle, a load is exerted on the outer turning wheels, and before the inner wheels are slipping, the inner wheel-side threshold Ath2 is set to be smaller than the outer wheel-side threshold Ath3.

10. The vehicle brake control device according to claim 8,
wherein the thresholds Ath1 to Ath3 are fixed values.

11. The vehicle brake control device according to claim 8,
wherein the thresholds Ath1 to Ath3 are not fixed values.

12. The vehicle brake control device according to claim 11,
wherein the front and rear wheel braking distribution controlling unit is configured to change the not-turning threshold Ath1 in accordance with a vehicle speed Vc such that as the vehicle speed Vc is increased, the not-turning threshold Ath1 is set to have a smaller value.

13. The vehicle brake control device according to claim 11,
wherein the front and rear wheel braking distribution controlling unit is configured to change the inner wheel-side threshold Ath2 in accordance with a vehicle speed Vc and the lateral acceleration G such that as the vehicle speed Vc is increased, the inner wheel-side threshold Ath2 is set to have a smaller value and also as the lateral acceleration G is increased, the inner wheel-side threshold Ath2 is set to have a smaller value.

14. The vehicle brake control device according to claim 11,
wherein the front and rear wheel braking distribution controlling unit is configured to change the outer wheel-side threshold Ath3 in accordance with a vehicle speed Vc and the lateral acceleration G such that as the vehicle speed Vc is increased, the outer wheel-side threshold Ath3 is set to have a smaller value and also as the lateral acceleration G is increased, the outer wheel-side threshold Ath3 is set to have a smaller value.

15. The vehicle brake control device according to claim 8,
wherein the decision on the inner wheels and the outer wheels is performed depending on a direction of a lateral acceleration sensor and whether or not the lateral acceleration is positive or negative number.

16. The vehicle brake control device according to claim 15,
wherein in case where the lateral acceleration sensor is arranged in such a direction that a positive lateral acceleration G is detected upon right turning of the vehicle, the front and rear wheel braking distribution controlling unit decides that the vehicle is turning right, when the positive lateral acceleration is acquired from the lateral acceleration sensor, and decides that the right front and left wheels are the inner wheels and the left front and rear wheels are the outer wheels, and
wherein the front and rear wheel braking distribution controlling unit decides that the vehicle is turning left, when a negative lateral acceleration G is acquired from the lateral acceleration sensor, and decides that the right front and left wheels are the outer wheels and the left front and rear wheels are the inner wheels.

* * * * *